(12) United States Patent
Xie et al.

(10) Patent No.: US 12,372,663 B1
(45) Date of Patent: Jul. 29, 2025

(54) BEIDOU SATELLITE EPHEMERIS PREDICTION METHOD AND SYSTEM BASED ON WATER-WAVE PARALLEL NETWORK

(71) Applicant: Guangdong University of Technology, Guangdong (CN)

(72) Inventors: Kan Xie, Guangdong (CN); Zhenni Li, Guangdong (CN); Qiming Chen, Guangdong (CN); Hailun Tan, Guangdong (CN); Shengli Xie, Guangdong (CN); Kungan Zeng, Guangdong (CN); Mingwei Wang, Guangdong (CN); Victor Fedorovich Kuzin, Moscow (RU)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/988,811

(22) Filed: Dec. 19, 2024

(30) Foreign Application Priority Data

Jul. 29, 2024 (CN) .......................... 202411020091.5

(51) Int. Cl.
*G01S 19/25* (2010.01)
*G01S 19/27* (2010.01)
*G01S 19/37* (2010.01)

(52) U.S. Cl.
CPC ............ *G01S 19/258* (2013.01); *G01S 19/27* (2013.01); *G01S 19/37* (2013.01)

(58) Field of Classification Search
CPC ......... G01S 19/258; G01S 19/27; G01S 19/37
See application file for complete search history.

(56) References Cited

U.S. PATENT DOCUMENTS

| 2014/0077991 | A1* | 3/2014 | Bar-Sever | ............... | G01S 19/27 |
| | | | | | 342/357.66 |
| 2023/0125115 | A1* | 4/2023 | Kuismanen | ............. | G01S 19/07 |
| | | | | | 342/357.44 |

FOREIGN PATENT DOCUMENTS

| CN | 109145434 A | * | 1/2019 |
| CN | 114791613 A | | 7/2022 |
| CN | 118348566 A | | 7/2024 |
| WO | 2022156480 A1 | | 7/2022 |

* cited by examiner

*Primary Examiner* — Cassi J Galt

(57) ABSTRACT

Disclosed is a BeiDou satellite ephemeris prediction method and system based on a water-wave parallel network. The method includes: receiving broadcast ephemeris data; calculating according to the broadcast ephemeris data to obtain a sequence of extrapolation errors and historical extrapolated states; and inputting the sequence of extrapolation errors and the historical extrapolated states into a pre-trained prediction model to output an error prediction result. The system includes: a data receiving module, a dynamical calculation module, an error prediction module and a correction module. The present disclosure allows for accurate ephemeris prediction at a lower computational cost, and can be widely applied in the field of trajectory prediction.

5 Claims, 8 Drawing Sheets

BEIDOU SATELLITE EPHEMERIS PREDICTION METHOD AND SYSTEM BASED ON WATER-WAVE PARALLEL NETWORK

CROSS-REFERENCE TO RELATED APPLICATION

This application claims priority of Chinese Patent Application No. 202411020091.5, filed on Jul. 29, 2024, the entire contents of which are incorporated herein by reference.

TECHNICAL FIELD

The present disclosure relates to the field of trajectory prediction, and in particular to a BeiDou satellite ephemeris prediction method and system based on a water-wave parallel network.

BACKGROUND

Ground receiver is crucial for users to obtain BeiDou satellite positioning services, involving the following procedures. The receiver quickly receives satellite pseudoranges within a few seconds and then takes at least 18 seconds to receive the broadcast ephemeris of BeiDou satellite. The broadcast ephemeris is employed to correct an embedded dynamical model for orbit prediction, so as to obtain ephemeris information including the current satellite position. After signals are received from at least four satellites, the user's position is calculated based on positioning principles. However, the prediction error of the dynamical model embedded in the receiver increases over time, resulting in an increasingly expended positioning error. Accordingly, the receiver has to spend time on updating ephemeris data, posing challenges to high-precision and rapid positioning of the receiver. Therefore, it is crucial to improve the long-term satellite ephemeris prediction accuracy on the user side (i.e., within the receiver). Currently, most research focuses on improving dynamical models. This method, based on the existing dynamical models (such as Kepler's model and SDP4), considers different correction terms of perturbative forces, and improves the integration order during orbit extrapolation, thereby enhancing orbit prediction accuracy and avoiding frequent reception of broadcast ephemeris. However, in early stages, these methods require complex force analysis and a large amount of observation data from different types of sensors to determine the correction terms and coefficients thereof, undergoing a process that is extensive in computation, time-consuming, and costly.

SUMMARY

Given the above mentioned problems, to address the technical problems that the existing ephemeris prediction methods focus on the improvement of dynamical models, involving a highly complex process for determining the parameters of the improved terms and requiring a vast amount of ephemeris observation data, and leading to excessive computational loads, the present disclosure provides a BeiDou satellite ephemeris prediction method based on a water-wave parallel network, including the following steps:
obtaining broadcast ephemeris data and historical precise satellite orbit data;
calculating according to the broadcast ephemeris data to obtain current extrapolated results and historical extrapolated states;
subtracting the historical precise satellite orbit data from the historical extrapolated states to obtain a sequence of extrapolation errors;
inputting the sequence of extrapolation errors and the historical extrapolated states into a pre-trained prediction model to output an error prediction result;
the prediction model including a patch layer, a water-wave recurrent acceleration network (WRAN), an attention (Attn) layer and an aggregation (Agg) layer; and
obtaining a corrected orbit prediction according to the error prediction result and the current extrapolated results.

In this example, the WRAN is introduced, and the proposed model inherently possesses recursive temporal characteristics. Compared to a Transformer model using positional encoding, the proposed model is more conducive to discovering the evolution rule of errors and provides more accurate prediction results.

The broadcast ephemeris data is expressed as follows:

$$A = [a_0 \ldots a_{t-1} \ a_t]$$

where A represents all the broadcast ephemeris data; $a_0$ represents broadcast ephemeris data at an initial moment; $a_{t-1}$ represents broadcast ephemeris data at a moment t−1; and $a_t$ represents broadcast ephemeris data at a moment t. Any one of the broadcast ephemeris data includes ephemeris reference time, square root of semi-major axis of orbit, orbital eccentricity, orbital inclination, right ascension of ascending node, orbital angular distance of perigee, mean anomaly, corrected value of mean angular velocity, variation rate of the right ascension of ascending node, variation rate of the orbital inclination, amplitude of the harmonic correction term for the cosine of the argument of latitude, amplitude of the harmonic correction term for the sine of the argument of latitude, amplitude of the harmonic correction term for the cosine of the satellite-to-earth-center distance, amplitude of the harmonic correction term for the sine of the satellite-to-earth-center distance, amplitude of the harmonic correction term for the cosine of the orbital inclination, and amplitude of the harmonic correction term for the sine of the orbital inclination.

In some examples, the calculating according to the broadcast ephemeris data to obtain current extrapolated results and historical extrapolated states specifically includes:
the broadcast ephemeris data including current broadcast ephemeris data and historical broadcast ephemeris data;
calculating using a dynamical model according to the current broadcast ephemeris data, to generate the current extrapolated results; and
calculating using the dynamical model according to the historical broadcast ephemeris data, to generate the historical extrapolated states.

Through this preferred step, the extrapolation error of the dynamical model is computed using the extrapolated data of the dynamical model and the actual precise orbit data.

In some examples, the prediction model is provided with an encoder channel and a decoder channel.

In some examples, the inputting the sequence of extrapolation errors and the historical extrapolated states into a pre-trained prediction model to output an error prediction result specifically includes:

concatenating the sequence of extrapolation errors and the historical extrapolated states to obtain concatenated data;

compressing, based on the patch layer, the concatenated data and the sequence of extrapolation errors separately to obtain compressed concatenated data and a compressed sequence of extrapolation errors;

inputting the compressed concatenated data into the encoder channel to generate an encoder output;

inputting the compressed sequence of extrapolation errors into the decoder channel to generate a decoder output;

performing feature fusion, based on a first Attn layer, on the encoder output and the decoder output to obtain final features; and outputting the error prediction result according to the final features.

Through this preferred step, a deep learning model is employed to learn from the historical dynamical model to extrapolate the error rule.

In some examples, the encoder channel sequentially includes a first WRAN, an Agg layer, and a second WRAN, and the inputting the compressed concatenated data into the encoder channel to generate an encoder output specifically includes:

inputting the compressed concatenated data into the encoder channel;

performing feature extraction by the first WRAN to obtain first layer temporal features and first epoch temporal features;

performing feature enhancement on the first layer temporal features by the Agg layer to obtain aggregated temporal features; and performing re-extraction on the aggregated temporal features by the second WRAN to obtain the encoder output.

In some examples, the decoder channel includes a third WRAN and a second Attn layer, and the inputting the compressed sequence of extrapolation errors into the decoder channel to generate a decoder output specifically includes:

inputting the compressed sequence of extrapolation errors into the decoder channel;

performing feature extraction by the third WRAN to obtain third epoch temporal features; and fusing the first epoch temporal features with the third epoch temporal features by the second Attn layer to obtain the decoder output.

In some examples, the WRAN has a net structure, and nodes in the WRAN are horizontal vertical gated selective units (HVGSU).

The first WRAN, the second WRAN and the third WRAN have basically same structure and principle.

The present disclosure also provides a BeiDou satellite ephemeris prediction system based on a water-wave parallel network, including:

a data receiving module for obtaining broadcast ephemeris data and historical precise satellite orbit data;

a dynamical calculation module for calculating according to the broadcast ephemeris data to obtain current extrapolated results and historical extrapolated states; and subtracting the historical precise satellite orbit data from the historical extrapolated states to obtain a sequence of extrapolation errors;

an error prediction module for inputting the sequence of extrapolation errors and the historical extrapolated states into a pre-trained prediction model to output an error prediction result, the prediction model including a patch layer, a WRAN, an Attn layer, and an Agg layer; and a correction module for obtaining a corrected orbit prediction according to the error prediction result and the current extrapolated results.

Based on the aforementioned solutions, the present disclosure provides a BeiDou satellite ephemeris prediction method and system based on a water-wave parallel network. The prediction model proposed by the present disclosure considers the extrapolation errors and temporal relationships of extrapolated states within a single reference epoch, as well as the extrapolation errors and temporal relationships of extrapolated states between different reference epochs, and simultaneously extracts temporal features of two dimensions using HVGSU. Additionally, for the extrapolation errors and extrapolated states obtained by extrapolating satellites at the same moment across different reference epochs, the WRAN is employed to simultaneously learn the representations of extrapolation errors of different reference epochs. For the redundant temporal feature representations, convolution is performed in the Agg layer to fuse features of adjacent HVGSU nodes, and a multi-head attention (MHA) mechanism is utilized to facilitate information exchange and fusion of the extracted temporal representations for satellite orbit error prediction, to correct subsequent satellite orbit extrapolation, ultimately achieving high-precision and high computational efficient ephemeris prediction for BeiDou satellite.

DETAILED DESCRIPTION

Figure 1:
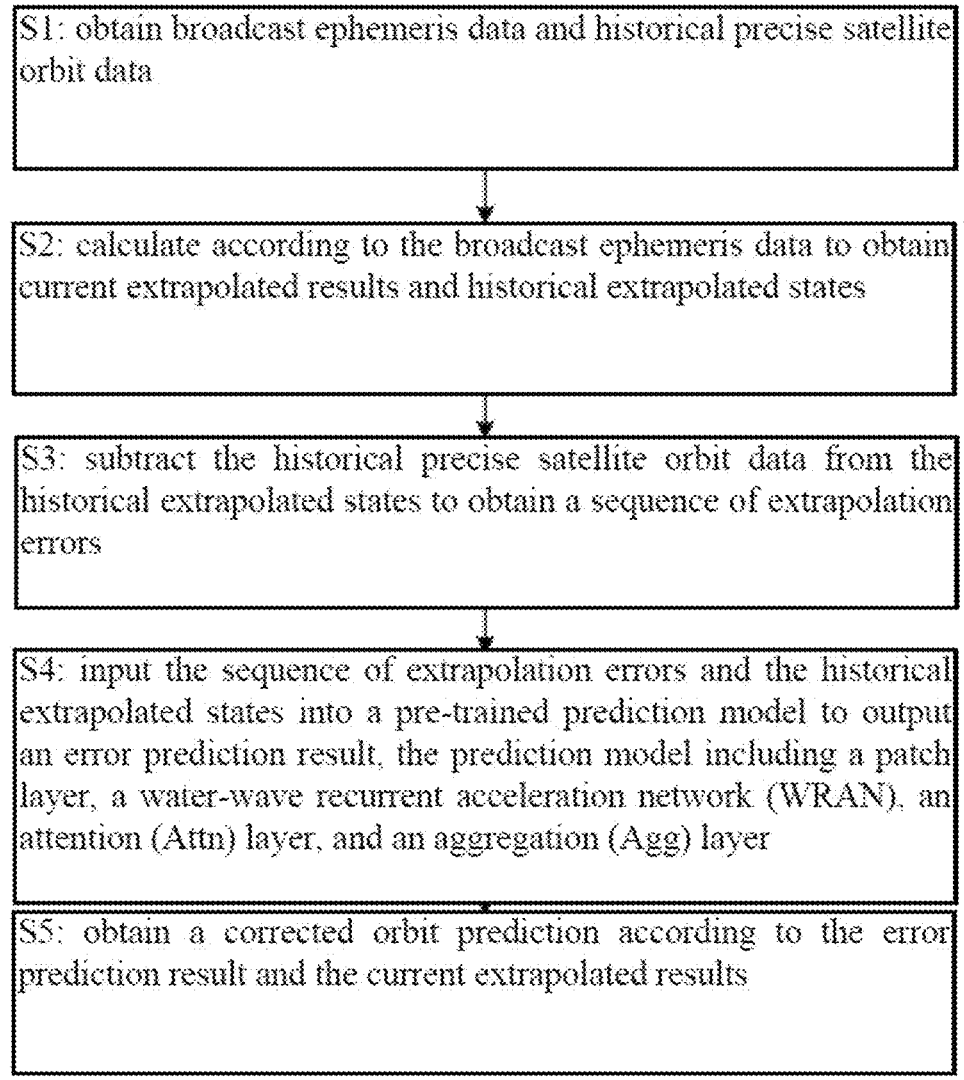
FIG. 1 is a flowchart of steps of a BeiDou satellite ephemeris prediction method based on a water-wave parallel network according to the present disclosure.

Besides the improvements to dynamical models mentioned in the background, with the rapid development of artificial intelligence (AI) technology, its powerful learning capabilities have been widely validated. In many studies, AI method has been applied to ephemeris prediction, aiming to indirectly model the complex gravitational forces acting on satellites and their impact on satellite ephemeris through data-driven model training, thereby reducing long-term ephemeris prediction errors. In some studies, neural networks (such as convolutional neural networks) are employed to construct models, all the forces acting on satellites are modeled, and future ephemeris information are directly predicted through historical ephemeris information. However, this method overly emphasizes the central gravitational force acting on satellites and neglects the modeling of perturbation terms, leading to significant bias in long-term prediction results. In other studies, AI models such as support vector machine (SVM) and long short-term memory (LSTM) networks are employed to model only the perturbative forces not considered in the existing dynamical models, and then perform error compensation on the prediction results of the existing dynamical models. However, this method fails to fully capture the nonlinear time-varying characteristics of complex perturbative forces, resulting in poor generalization performance and low prediction accuracy of the trained AI models, thereby failing to meet the requirements for ephemeris accuracy in user positioning within the BeiDou system.

The technical solutions of the examples in the present application are described clearly and completely below. Obviously, the examples described are only some, rather than all examples of the present application. On the basis of the examples of the present application, all other examples obtained by those ordinary skilled in the art without creative efforts fall within the scope of protection of the present application.

It is to be noted that, for ease of description, only portions relevant to the present disclosure are shown in the accompanying drawings. The examples and features therein of the present application can be combined with each other without conflict.

It is to be understood that the terms "system", "device", "unit", and/or "module" used in the present application serve for distinguishing between different components, elements, parts, sections, or assemblies at different levels. If other terms can achieve the same purpose, they can be used to replace these terms.

Unless explicitly indicated otherwise by the context, the words "one", "a/an", and/or "the" do not necessarily refer to the singular but can also include the plural. Generally speaking, the terms "include" and "contain" merely indicate that the steps and elements that have been clearly identified are included, and these steps and elements do not constitute an exclusive enumeration. The method or apparatus may also include other steps or elements. The element defined by a sentence "including a . . . " is not excluded that there are other identical elements in the process, method, article or apparatus.

In the description of examples of the present application, "a plurality of" means two or more. The terms as "first" and "second" are only used to describe the objective, not to be understood as indicating or implying relative importance or indicating the quantity of technical features indicated. Therefore, a feature defined with "first" and "second" may include one or more of these features explicitly or implicitly.

Additionally, flowcharts are used in the present application to illustrate the operations executed by the system according to examples of the present application. It is to be understood that the preceding or subsequent operations may not necessarily be performed in exact sequence. Instead, the steps can be processed in reverse order or simultaneously. Additionally, other operations can be added to these processes, or one or more steps can be removed from them.

To clearly introduce the technical implementation of the present disclosure hereinafter, it is necessary to first distinguish and introduce some terms. Firstly, in the present disclosure, the reference epoch is referred to as simply an epoch. The internal dynamical model parameters of the receiver differ across different epochs, leading to different extrapolated orbit data. The overall results calculated from data within a single reference epoch are referred to as within-epoch, while the extrapolated results between different epochs are referred to as between-epochs. In addition, the predicted ephemeris related to the dynamical model is referred to as extrapolation or calculation, while the output of the prediction model is referred to as prediction.

Referring to FIG. 1, which is a schematic flow diagram of an alternative example for a BeiDou satellite ephemeris prediction method based on a water-wave parallel network proposed in the present disclosure. This method is applicable to computer apparatuses. The prediction method proposed in this example can include but is not limited to the following steps.

Step S1, broadcast ephemeris data and historical precise satellite orbit data are obtained.

Step S2, according to the broadcast ephemeris data, extrapolation is performed to obtain current extrapolated results and historical extrapolated states.

Step S3, the historical precise satellite orbit data is subtracted from the historical extrapolated states to obtain a sequence of extrapolation errors.

Step S4, the sequence of extrapolation errors and the historical extrapolated states are inputted into a pre-trained prediction model to output an error prediction result.

The prediction model includes a patch layer, a WRAN, an Attn layer, and an Agg layer.

Step S5, a corrected orbit prediction is obtained according to the error prediction result and the current extrapolated results.

In some feasible examples, step S1 further includes organizing the broadcast ephemeris data, and specifically includes the following process.

During ephemeris prediction for BeiDou satellites in the present disclosure, the first step is to use a BeiDou satellite acquisition module TD1050 to receive broadcast ephemeris data. The employed dynamical model is the Kepler's dynamical model, which only considers the orbital motion of the satellite under the central gravitational force of the earth. The time interval for orbital dynamical computations, i.e., the reference epoch interval, is selected as 1 hour. Every hour, the receiver receives the BeiDou broadcast ephemeris to update the dynamical model parameters (six number of roots) and performs orbital extrapolation of ephemeris data. The extrapolation duration is 14 days, with half an hour as a time node, a total of 672 nodes.

The broadcast ephemeris data is expressed as follows:

$$A = [a_0 \ldots a_{t-1} \, a_t]$$

where A represents all the broadcast ephemeris data; $a_0$ represents broadcast ephemeris data at an initial moment; $a_{t-1}$ represents broadcast ephemeris data at a moment t−1; and $a_t$ represents broadcast ephemeris data at a moment t. Any one of the broadcast ephemeris data includes ephemeris reference time, square root of semi-major axis of orbit, orbital eccentricity, orbital inclination, right ascension of ascending node, orbital angular distance of perigee, mean anomaly, corrected value of mean angular velocity, variation rate of the right ascension of ascending node, variation rate of the orbital inclination, amplitude of the harmonic correction term for the cosine of the argument of latitude, amplitude of the harmonic correction term for the sine of the argument of latitude, amplitude of the harmonic correction term for the cosine of the satellite-to-earth-center distance, amplitude of the harmonic correction term for the sine of the satellite-to-earth-center distance, amplitude of the harmonic correction term for the cosine of the orbital inclination, and amplitude of the harmonic correction term for the sine of the orbital inclination.

After collecting the broadcast ephemeris data A, each broadcast ephemeris data can be solved and orbitally extrapolated through the Kepler's dynamical model, to obtain approximate satellite orbit position and velocity information for the next 14 days, i.e., the historical extrapolated state. All the data is represented by $\hat{\Psi} \in \mathbb{R}^{N \times 672 \times 6}$, where $\mathbb{R}$ represents a real number domain, and N represents the number of epochs. The specific formula is as follows:

$$\hat{\Psi} = \begin{bmatrix} \hat{\varphi}(t_i, t_i) & \hat{\varphi}(t_i, t_{i+1}) & \cdots & \hat{\varphi}(t_i, t_{i+671}) \\ \hat{\varphi}(t_{i+2}, t_{i+2}) & \hat{\varphi}(t_{i+2}, t_{i+3}) & \cdots & \hat{\varphi}(t_{i+2}, t_{i+673}) \\ \vdots & \vdots & \vdots & \vdots \\ \hat{\varphi}(t_{i+2N-2}, t_{i+2N-2}) & \hat{\varphi}(t_{i+2N-2}, t_{i+2N-1}) & \cdots & \hat{\varphi}(t_{i+2N-2}, t_{i+2N+669}) \end{bmatrix}$$

In the above formula, taking the first row as an example, each row mainly reflects the state (three-axis position and velocity) extrapolated every half an hour from the moment $t_i$, for a total of 14 days and 672 nodes.

$\hat{\varphi}(t_j, t_k)$ represents that the ephemeris information at moment $t_k$ is extrapolated from the broadcast ephemeris at the moment $t_j$ through the dynamical model. The ephemeris information includes three-axis satellite position and three-axis satellite velocity, a total of six features. $i \leq j \leq k \leq i+2N+669$.

The following definitions are given: a set consisting of all time points extrapolated from the broadcast ephemeris at the moment $t_i$ is denoted as $\hat{\Psi}_{t_i}$, which corresponds to one row of data in $\hat{\Psi}$. Between rows, for example, between $\hat{\Psi}_{t_i}$ and $\hat{\Psi}_{t_{i+2}}$, i.e., the interval of epochs is 1 hour. Additionally, since different reference epochs possess different broadcast ephemerides, the results obtained from calculating the orbital state at the same moment from different reference epochs are different, i.e., $\hat{\varphi}(t_i, t_{i+10}) \neq \hat{\varphi}(t_{i+2}, t_{i+10})$. Therefore, during constructing historical extrapolation errors as input, considering the extrapolation errors from multiple reference epochs as input, i.e., multi-epoch data enhancement, will make the model more accurate, generalizable, and resistant to interference.

Furthermore, the corresponding precise orbit data can be denoted as $\Psi \in \mathbb{R}^{(N+672) \times 3}$.

In some feasible examples, step S2 specifically includes the following process.

The broadcast ephemeris data includes current broadcast ephemeris data and historical broadcast ephemeris data.

S2.1, according to the current broadcast ephemeris data, calculation is performed using a dynamical model to generate the current extrapolated results.

S2.2, according to the historical broadcast ephemeris data, calculation is performed using the dynamical model to generate the historical extrapolated states.

In some feasible examples, step S3 specifically includes the following process.

Specifically, by subtracting $\Psi$ at corresponding moment from $\hat{\Psi}$, the historical ephemeris prediction position error values for the orbital dynamical model can be obtained. Due to the lack of velocity information in the data, the final historical prediction error only consists of three features: position errors in the x, y, and z directions. This error is denoted as $E \in \mathbb{R}^{N \times 672 \times 3}$, and is expressed as the following formula:

$$E = \begin{bmatrix} \hat{e}(t_i, t_i) & \hat{e}(t_i, t_{i+1}) & \cdots & \hat{e}(t_i, t_{i+671}) \\ \hat{e}(t_{i+2}, t_{i+2}) & \hat{e}(t_{i+2}, t_{i+3}) & \cdots & \hat{e}(t_{i+1}, t_{i+673}) \\ \vdots & \vdots & \vdots & \vdots \\ \hat{e}(t_{i+2N-2}, t_{i+2N-2}) & \hat{e}(t_{i+2N-2}, t_{i+2N-1}) & \cdots & \hat{e}(t_{i+2N-2}, t_{i+2N+669}) \end{bmatrix}$$

Figure 3:
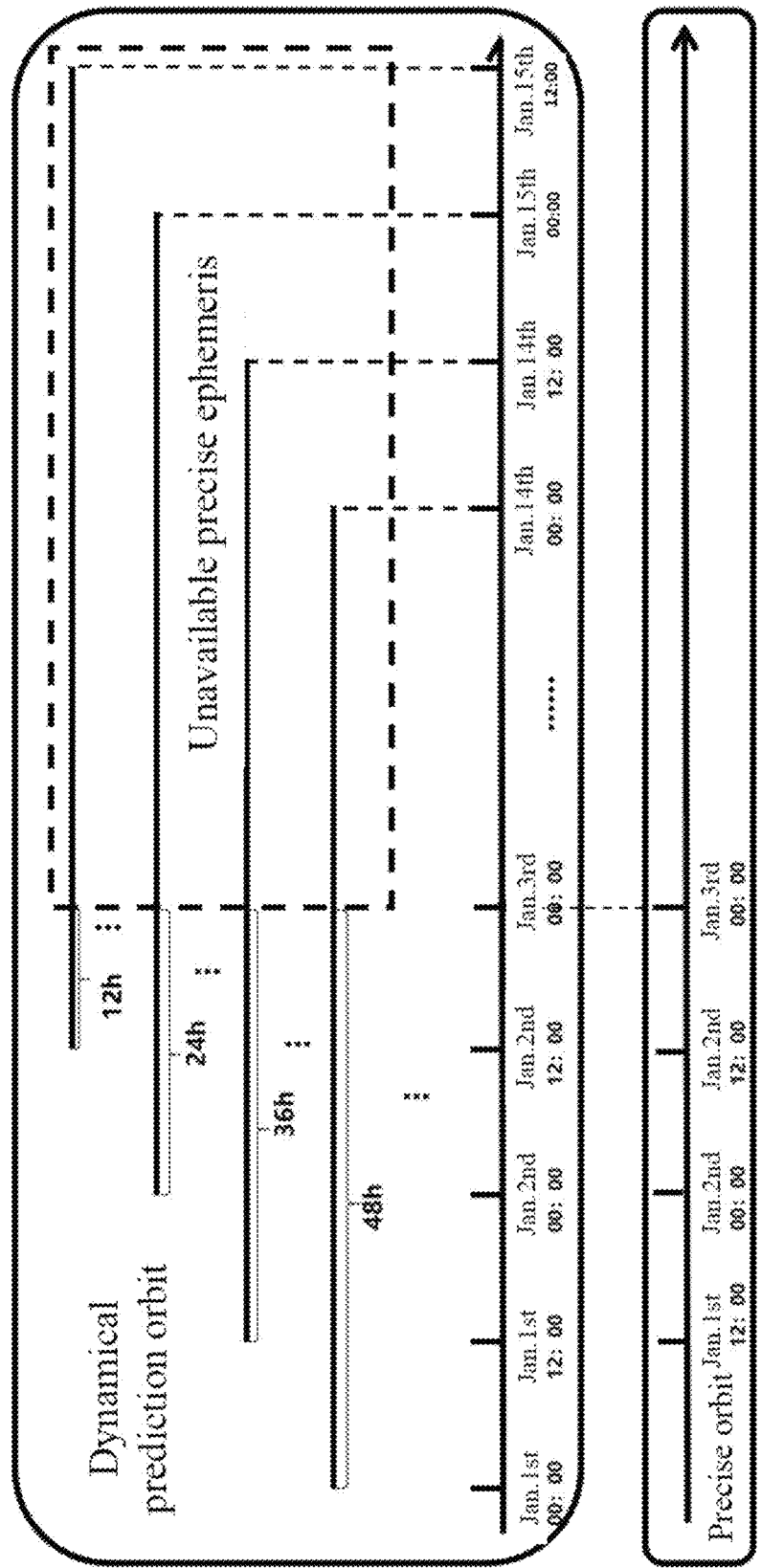
FIG. 3 is a diagram comparing the length of historical extrapolation errors of different epochs according to a specific example of the present disclosure.

During constructing the historical ephemeris extrapolation error for a certain epoch, since the precise ephemeris available at the last moment for different reference epochs is the same, i.e., $\Psi(t_k)$, the lengths $\hat{e}_j$ corresponding to different epochs are different. Taking FIG. 3 as an example, during constructing the historical extrapolation error for January 3rd at 00:00, since at this moment, the precise ephemeris can only be obtained up to January 3rd at 00:00 or before, the lengths of the historical extrapolation errors obtained for different reference epochs such as for January 1st at 00:00 and January 1st at 12:00 are 48 hours and 36 hours, respectively, which are inconsistent.

In the present disclosure, ephemeris prediction for the orbit over the next 14 days is performed. During selecting the input for constructing the model, considering the redundancy of the time series and the deployment cost of the model, the historical extrapolation errors within the past 7 days are selected, with one epoch selected every 12 hours, resulting in a sequence of extrapolation errors for 14 reference epochs, denoted as $E_{input}$. In $E_{input}$, each row of elements is padded with 0 to the same length, so that $E_{input} \in \mathbb{R}^{M \times 14 \times 336 \times 3}$, where M represents the number of samples obtained after processing.

Additionally, the output of the model is the prediction error of the satellite ephemeris for the next 14 days extrapolated at the final moment, denoted as $E_{output} \in \mathbb{R}^{M \times 672 \times 3}$. In the example in FIG. 3, the output of the deep learning model is the extrapolation error estimate for the orbit extrapolated over 14 days starting from January 3rd at 00:00. The following formula provides a specific set of input and output in $E_{input}$ and $E_{output}$, with a moment $t_i$ in each sample defined as an initial moment.

$$E_{in0} = \begin{bmatrix} \hat{e}(t_i, t_i) & \cdots & \cdots & \cdots & \cdots & \hat{e}(t_i, t_{i+335}) \\ \hat{e}(t_{i+24}, t_{i+24}) & \cdots & \cdots & \cdots & \hat{e}(t_{i+24}, t_{i+335}) & 0 \\ \vdots & \vdots & \vdots & \vdots & 0 & 0 \\ \hat{e}(t_{i+311}, t_{i+335}) & \cdots & \hat{e}(t_{i+311}, t_{i+335}) & 0 & 0 & 0 \end{bmatrix}$$

$$E_{out0} = [\hat{e}(t_{i+336}, t_{i+336}) \, \hat{e}(t_{i+336}, t_{i+337}) \, \cdots \, \hat{e}(t_{i+336}, t_{i+336+671})]$$

where, $E_{in0}$ and $E_{out0}$ represent a set of input and output corresponding to the extrapolation error.

In the same way, considering that the historical extrapolated state also contains a wealth of information, the same treatment is performed on the original extrapolated state $\hat{\Psi}$, to obtain $\hat{\Psi}_{input} \in \mathbb{R}^{M \times 14 \times 336 \times 6}$.

$$\hat{\Psi}_{in0} =$$

$$\begin{bmatrix} \hat{\varphi}(t_i, t_i) & \cdots & \cdots & \cdots & \cdots & \hat{\varphi}(t_i, t_{i+335}) \\ \hat{\varphi}(t_{i+24}, t_{i+24}) & \cdots & \cdots & \cdots & \hat{\varphi}(t_{i+24}, t_{i+335}) & 0 \\ \vdots & \vdots & \vdots & \vdots & 0 & 0 \\ \hat{\varphi}(t_{i+311}, t_{i+335}) & \cdots & \hat{\varphi}(t_{i+311}, t_{i+335}) & 0 & 0 & 0 \end{bmatrix}$$

where $\hat{\Psi}_{in0}$ represents a set of input for the extrapolated state.

In some feasible examples, step S4 specifically includes the following process.

S4.1, the prediction model is constructed using the patch layer, the WRAN, the Attn layer, and the Agg layer.

Figure 4:
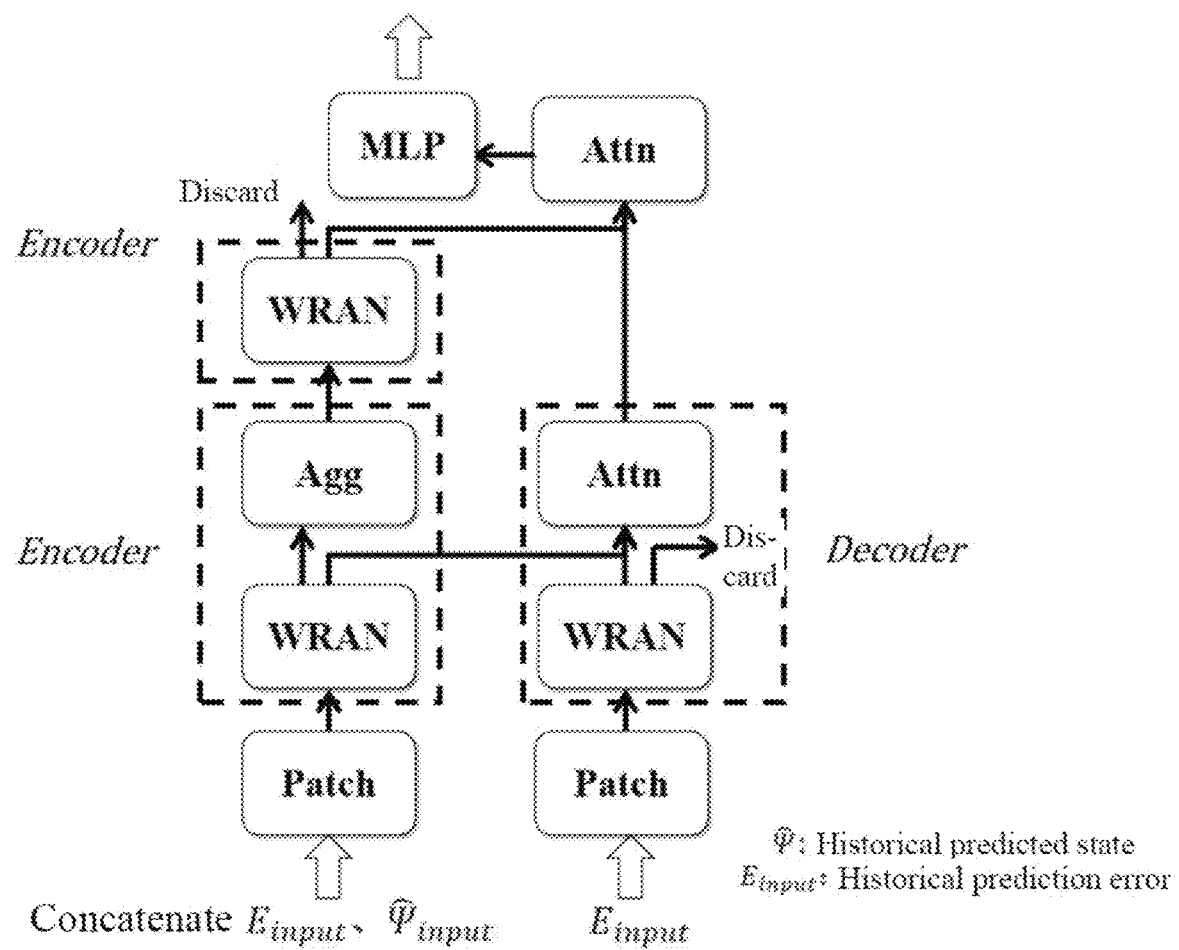
FIG. 4 is schematic diagram showing data flow of a prediction model according to a specific example of the present disclosure.

On the basis of this prediction model, ephemeris error prediction is realized, and the prediction results of the dynamical learning model are compensated. The overall framework structure of the prediction model is referred to FIG. 4, and the prediction model is provided with an encoder channel and a decoder channel.

S4.2, the prediction model is trained to obtain a pretrained prediction model.

S4.3, the sequence of extrapolation errors and the historical extrapolated states are concatenated to obtain concatenated data.

S4.4, based on the patch layer, the concatenated data and the sequence of extrapolation errors are compressed separately to obtain compressed concatenated data and a compressed sequence of extrapolation errors.

S4.5, the compressed concatenated data is inputted into the encoder channel to generate an encoder output.

S4.6, the compressed sequence of extrapolation errors is inputted into the decoder channel to generate a decoder output.

S4.7, based on a first Attn layer, feature fusion is performed on the encoder output and the decoder output to obtain final features.

S4.8, the error prediction result is outputted according to the final features.

Specifically, $E_{input}$ and $\hat{\Psi}_{input}$ are concatenated along the last dimension and then inputted into a patch layer, which divides the longer sequence into several batches of lengths and compresses them. The compressed data are inputted into the encoder and decoder. The WRAN network in the encoder structure learns temporal features, while the decoder focuses more on the feature of extrapolation errors. The attention mechanism is utilized to interact and fuse the temporal features outputted by the decoder and encoder.

After multiple layers of information fusion, the features containing rich temporal information are subjected to temporal prediction using a multi-layer perceptron (MLP), which then outputs the future prediction error results.

In some feasible examples, S3.4 specifically includes the following process.

The concatenated data is denoted as $A \in \mathbb{R}^{M \times 14 \times 336 \times 9}$.

During compressing A in batches, considering the temporal relationship of subsequent WRAN computations, the size of the selected patch is a sequence length of 12 hours, with 24 corresponding nodes. The compressed concatenated data obtained is denoted as $A_{patch} \in \mathbb{R}^{M \times 14 \times 14 \times 216}$.

$E_{input}$ is subjected to similar compressing to obtain the compressed sequence of extrapolation errors, denoted as $B_{patch} \in \mathbb{R}^{M \times 14 \times 14 \times 72}$.

After undergoing a linear transformation layer, layer normalization, and a non-linear function, $A_{patch}$ and $B_{patch}$ can be transformed into $E_{Enc} \in \mathbb{R}^{M \times 14 \times 14 \times hidsize1}$ and $E_{Dec} \in \mathbb{R}^{M \times 14 \times 14 \times hidsize2}$.

At this point, the task of the entire patch layer is complete.

Compressing is a processing method commonly used in the field of time series. On the one hand, it compresses redundant time series by sharing parameters, effectively reducing the complexity of subsequent computations. On the other hand, patch allows the model during sequence processing to pay attention to both the temporal features within a single batch (short-term) and the temporal features between batches (long-term).

Figure 5:
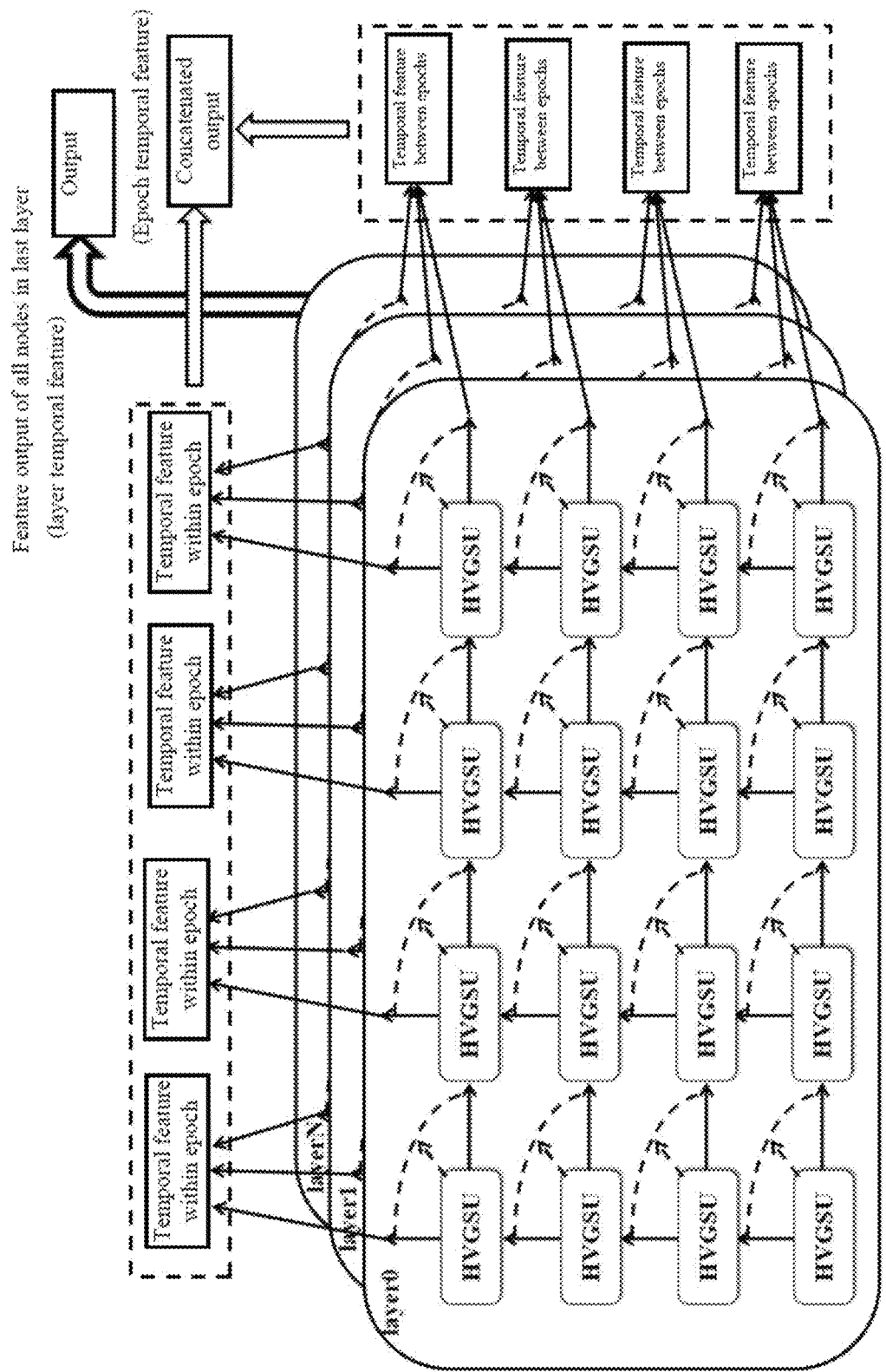
FIG. 5 is a schematic structural diagram of a WRAN according to a specific example of the present disclosure.
Figure 6:
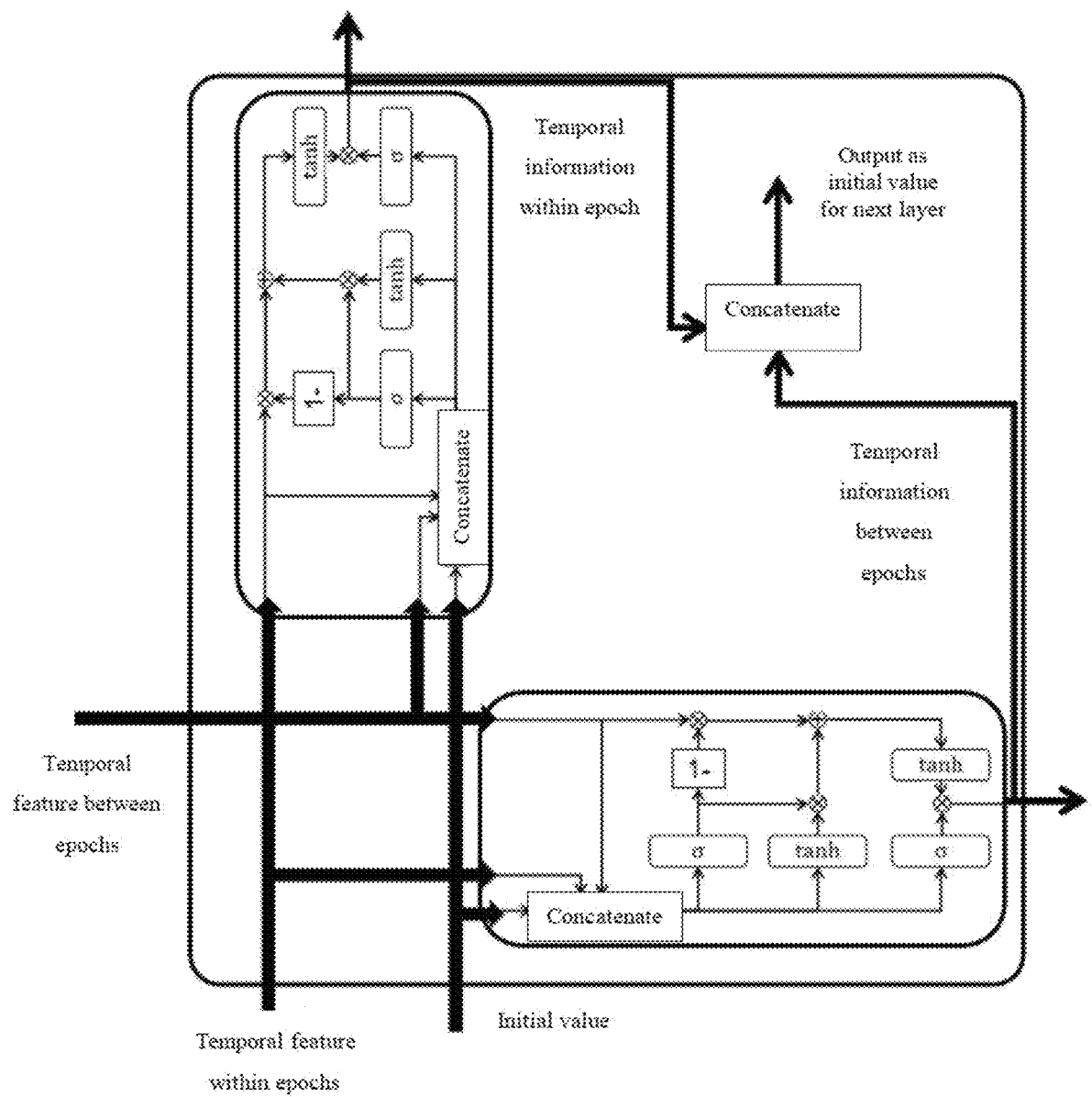
FIG. 6 is a schematic structural diagram of an HVGSU according to a specific example of the present disclosure.

In some feasible examples, the structure of WRAN is shown in FIG. 5. WRAN has a net structure, with each node being an HVGSU. The structure of HVGSU is shown in FIG. 6.

The WRAN is a latest model in the field of time series prediction. This model can learn temporal features considering both long-term and short-term dimensions, while utilizing a general parallel computing network architecture to simultaneously learn long-term and short-term temporal features, thereby improving computational efficiency. For the ephemeris prediction task with multi-epoch inputs, the present disclosure utilizes WRAN to extract temporal features between epochs and within epochs, fully exploring the time-varying trends of ephemeris errors. For the features of prediction and extrapolated states of satellites at the same moment in different epochs, a parallel computing structure is used for simultaneous feature processing, and the processed information is simultaneously transmitted to the feature processing of satellites at the next moment, fully exploring the intrinsic temporal relationships between multiple epochs to achieve more accurate ephemeris prediction.

The working process of HVGSU is as follows.

$E_{Enc}$ and $E_{Dec}$ are inputted into WRAN modules corresponding to the encoder channel and decoder channel, respectively.

Figure 7:
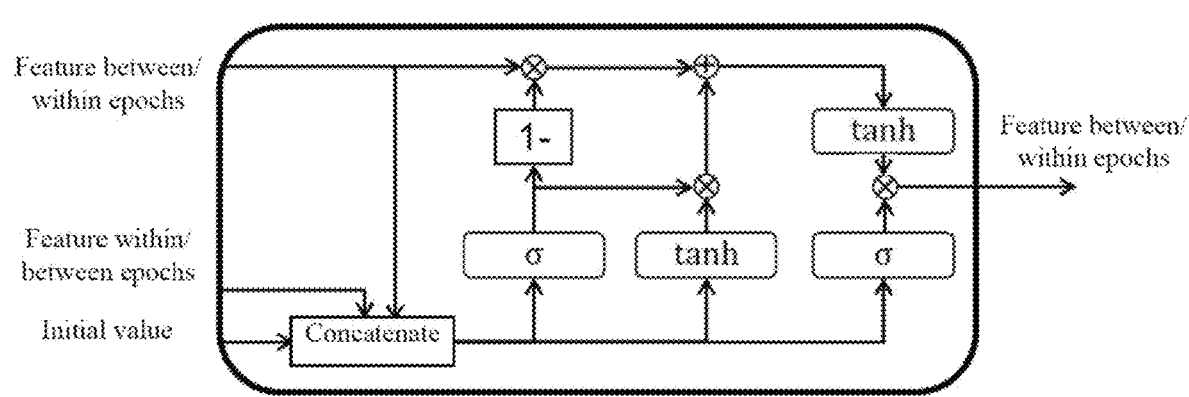
FIG. 7 is an enlarged diagram of a gate selective unit (GSU) part in HVGSU according to a specific example of the present disclosure.

Based on the input data size, the WRAN of the present disclosure is determined to be a 14×14 grid-like network with 14×14 HVGSUs. For the $0_{th}$ layer of WRAN, i.e., layer 0 in FIG. 5, since there is no output from the previous layer, the initial state of each HVGSU is uniquely determined by the input data, corresponding to the initial value part in FIGS. 6 and 7. It is worth noting that, according to the previous compressing step, each node inputted into the $0_{th}$ layer of WRAN contains 12 hours of compressed temporal information. Additionally, the first row of $E_{in0}$, which is not padded with 0, corresponds to the first column in the $0_{th}$ layer of WRAN in FIG. 5.

Due to the similar information transmission structures in the two directions, the workflow of GSU is explained below using the between-epochs (i.e., the row direction in FIG. 5) as an example. The computation process for any one of GSU nodes is as follows. When information from three dimensions: the historical state between epochs $h_{t-1}^H$, the historical state within epochs $h_{t-1}^V$, and the initial state $h_t^S$ are received, the selection gate, which serves for deciding to discard useless information from the historical moments of the time series samples, is first updated. The sigmoid function is employed to determine that how much output information $h_{t-1}$ and historical state $h_{t-1}^H$ at the previous moment is preserved in the current cell state $h_t^H$, and the computation formula is as follows:

$$S_t = \sigma(W_S \cdot g[h_{t-1}^H, h_{t-1}^V, h_t^S] + b_t)$$

where σ represents the sigmoid function, $W_S$ represents a first weight matrix, $b_t$ represents a first bias term, $h_t^S$ represents an initial state of the current network input, g represents vector concatenation, and for $h_{t-1}^H$ states that cannot be obtained, 0 padding is used as input. If $h_{t-1}^H$ is considered more important, $S_t$ tends to output close to 0. If the information from $h_{t-1}^V$ and $h_t^S$ is considered more important, $S_t$ tends to output 1.

After processing through the selection gate, the state $h_{t-1}^H$ information between epochs needs to be initially updated through an input gate, to obtain the comprehensive information of multiple historical epochs. This is mainly achieved using the product of the information processed by the sigmoid function and the information processed by the tanh function, representing the basic information $h_{t-1}^H$ to be transmitted to the current cell state $h_t^H$ from the current input $h_{t-1}^H$. The computation formula for the input gate is as follows:

$$h_{t-1}^{\tilde{H}}=(1-S_t)\odot h_{t-1}^H+S_t\odot \tanh(W_c\cdot g[h_{t-1}^H,h_{t-1}^V,h_t^S]+b_c$$

where $W_c$ represents a second weight matrix, $b_c$ represents a second bias term, and the rest of definitions are the same as previously mentioned.

The processed state information is encoded into a fixed sequence output through an output gate. Similarly, the product of the information processed by the sigmoid function and the information processed by the tanh function is utilized to determine that how much information from the basic information $h_{t-1}^{\tilde{H}}$ can be updated as the current cell state $h_t^H$. The computation formula is as follows:

$$h_t^H=\sigma(W_0\cdot g[h_{t-1}^H,h_{t-1}^V,h_t^S]+b_0)\cdot \tanh(h_{t-1}^{\tilde{H}})$$

where $W_0$ represents a third weight matrix, $b_0$ represents a third bias term, and the rest of definitions are the same as previously mentioned.

Through cyclic updating of multi-epoch sequences and by means of horizontal vertical gated selective functions, the final output state information includes a mixture of important information from multiple historical moments.

Specifically, on the one hand, for a single reference epoch, there is a temporal relationship between the ephemeris errors within it; and on the other hand, since different epochs themselves represent a temporal relationship, there is also a temporal relationship existing in the ephemeris errors between different epochs. These two dimensions do not have a sequential order, in the present disclosure, HVGSU is employed to learn the temporal relationships of these two dimensions simultaneously.

The specific working process of WRAN is as follows.

The workflow for a single HVGSU is as described above, but for the entire network, the computation order of different HVGSUs will lead to different initial values for the node states of the next layer. The WRAN used herein employs a general parallel computing structure to perform parallel computations on the state and error descriptions of satellites at the same moment across different epochs. Taking FIG. 3 as an example, its WRAN computation flow is shown in FIG. 8.

Figure 8:
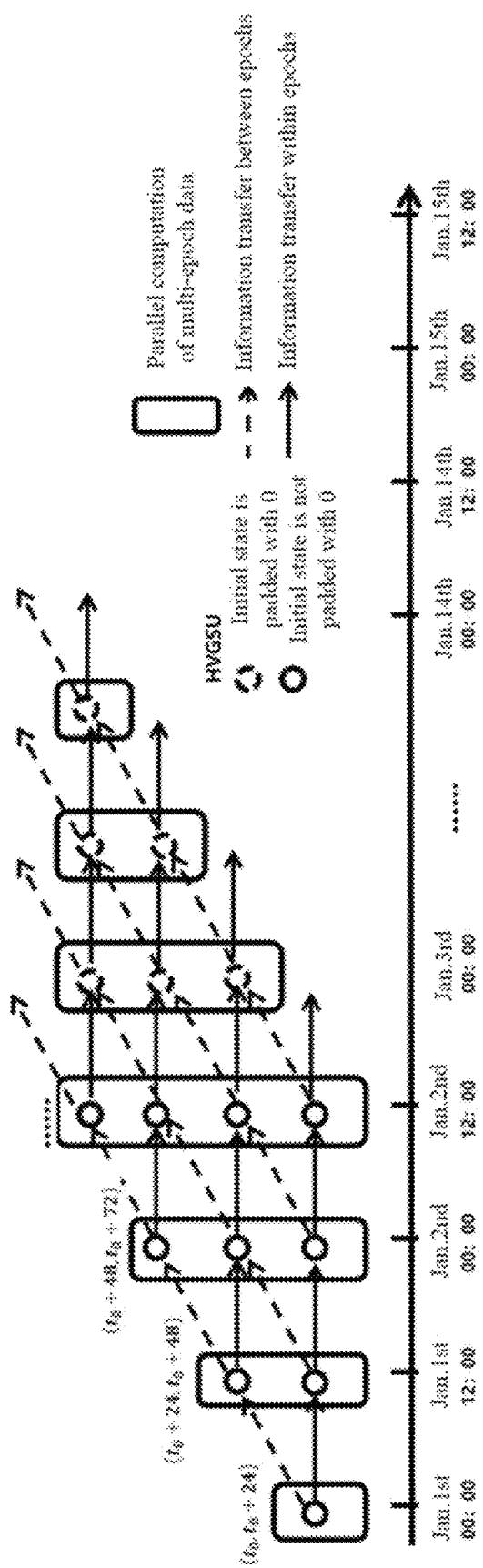
FIG. 8 is a schematic diagram showing the parallel computing of multi-epoch data according to a specific example of the present disclosure.

Computations begin with the initial node containing the initial moment to, and this node corresponds to the first node in the lower left corner of FIG. 8 and also corresponds to the first node in the lower left corner of the grid-like network in FIG. 5. The computation flow has been detailed in the HVGSU computation process above. Additionally, in the patch operation, the 12-hour data is divided into batches, with two nodes per hour, so this node contains the extrapolated state and extrapolation error information for the satellite at moments ($t_0$, $t_0+24$).

After computing the state of the first node, the outputted two dimensions of information will be simultaneously inputted into the first node of the epoch on the right of the initial node in the grid-like network in FIG. 5 and the next node within the epoch, corresponding to the two nodes in the second column of FIG. 8. The two nodes represent the feature information of the extrapolated state and extrapolation error for the satellite at moments ($t_0+24$, $t_0+48$) based on data from two different reference epochs.

In the cyclic computation flow of FIG. 8, a wave-like information transmission effect is presented in FIG. 5, with temporal information gradually spreading to the HVGSU nodes describing the future state of the satellite. The initially set 0-filled data is supplemented through multiple layers of WRAN.

The final output selected by the present disclosure is shown in FIG. 5. In each layer of WRAN, the last predicted state $h_{Enc0}^{col}\in \mathbb{R}^{M\times layerN\times 14\times hidsize1}$ within multiple epochs and the last predicted state $h_{Enc0}^{row}\in \mathbb{R}^{M\times layerN\times 14\times hidsize1}$ between multiple epochs are used as outputs. These two are concatenated after being averaged separately to obtain $h_{Enc0}\in \mathbb{R}^{M\times 28\times hidsize1}$.

The state of the last layer of WRAN is also used as an output to explore deeper temporal features $out_{Enc0}\in \mathbb{R}^{M\times 14\times 14\times 2hidsize1}$. Similarly, for the decoder, $h_{Dec0}\in \mathbb{R}^{M\times 28\times hidsize2}$ is obtained, and the temporal feature $out_{Dec0}$ of the corresponding layer is discarded due to its relatively redundant information.

LayerN represents the number of layers of WRAN, and hidsize1 and hidsize2 are the dimensions of the temporal feature output information for the encoder and decoder layers, respectively.

The present disclosure simulates the time-varying characteristics of the perturbative forces acting on satellites from a temporal perspective. The prediction errors obtained by extrapolating satellites at the same moment across different epochs represent different angular extrapolations of the satellite at that moment. Therefore, the present disclosure, through WRAN, performs parallel computations on the HVGSU processing these errors. These errors are jointly subjected to dependency capture and used as historical information to act on the dependency capture for the satellite at next moment, thereby simulating the time-varying characteristics of the perturbative forces acting on satellites from a temporal perspective.

In some feasible examples, the working process of the Attn layer is as follows.

The Attn layer employs an MHA mechanism.

The MHA mechanism possesses not only the advantage of parallel computation but also powerful modeling capabilities, allowing the model to focus on different parts of the input sequence simultaneously in multiple aspects. For $h_{Enc0}$ and $h_{Dec0}$ extracted in the previous step by the present disclosure, which are temporal features extracted from the WRAN in the encoder and decoder, respectively, information fusion is performed, and the dynamic characteristics and complex relationships of the temporal features are captured through the MHA mechanism.

Since the decoder only inputs historical extrapolation errors as features into WRAN, the obtained temporal features are only related to historical errors, but the encoder includes the temporal features of historical extrapolated states. In summary, considering that the satellite position in ephemeris prediction results is crucial for downstream positioning tasks, hpeco is determined as input for K and V, and $h_{Enc0}$ is used as input for Q. After determining the inputs, the workflow of MHA is briefly introduced as follows.

The previously obtained $h_{Enc0}$ and $h_{Dec0}$ are inputted into an MHA mechanism layer that is built upon the self-attention mechanism layer, and the formula for self-attention mechanism is:

$$\bar{h} = \text{Attention}(Q, K, V) = \text{softmax}\left(\frac{QK}{\sqrt{d_k}}\right)V$$

where $Q=W_Q h_{Enc0}$, $K=W^K h_{Dec0}$ and $V=W^V h_{Dec0}$, Q, K, and V learn the projections of temporal features in different directions, and $W^Q$, $W^K$ and $W^V$ represent the corresponding weights. A normalized attention score matrix is obtained using the nonlinear activation function softmax and a scaling factor $\sqrt{d_k}$, and temporal features are fused based on attention scores. Additionally, the number of attention heads is set as m, and the output result $\bar{h}$ is obtained by averaging the results of m heads and then normalizing them.

By incorporating some nonlinear factors into a feedforward neural network layer, the expressive ability of the model is enhanced. Specifically, linear layers F of equal dimensions are used, and an activation function Relu is introduced for nonlinear operations. Similarly, to enhance the generalization ability of network, residual connections and layer normalization operations are introduced at the end of this layer, and the final obtained temporal feature is expressed as $h_{attn0} \in \mathbb{R}^{M \times 28 \times hidsize3}$, where hidsize3 represents the dimension of the fully connected layers in $W^Q$, $W^K$, and $W^V$ of the module, and $\bar{h}$ represents intermediate state of the input after passing through MHA.

$$h_{attn0} = Relu(F(\bar{h})) + \bar{h}$$

In some feasible examples, the working process of the Agg layer is as follows.

For the previously extracted $out_{Enc0}$, on the one hand, it undergoes continuous wave-like information diffusion through multiple layers of WRAN network, and the feature information of adjacent HVGSU nodes will be similar. On the other hand, the larger number of rows and columns in WRAN can affect training efficiency. Therefore, it is necessary to perform aggregation on the initially extracted feature information.

For the inputted $out_{Enc0}$, considering the aggregation of information from its adjacent nodes, it is resized and inputted into a two-dimensional convolutional network. At the same time, an appropriate convolution kernel and step size are determined. When the previous layer of WRAN network is longer, a smaller convolution kernel and step size can be considered, and when the network itself is relatively small, it can be considered to skip the two-dimensional convolution or choose a 1×1 convolution kernel with a step size of 1. The parameter setting of this example is as follows. The convolution kernel is 2×2, and the step size is 2. This convolution kernel can combine the features of a certain range of nodes into the feature information of a single node, and the output dimension is reduced to half of the original. Taking the above convolution kernel as an example, the output is $\widehat{out}_{agg0} \in \mathbb{R}^{M \times 7 \times 7 \times hidsize1}$.

After obtaining $\widehat{out}_{agg0}$, it undergoes a fully connected layer and non-linear Relu activation function, and the importance of the feature is computed. Finally, it undergoes the normalization function softmax for weight normalization.

The normalized weight score $\in \mathbb{R}^{M \times 7 \times 7 \times hidsize1}$ obtained subsequently is then element-wise multiplied with the output result $\widehat{out}_{Encoder}$ of the two-dimensional convolution and added to itself, resulting in a grid $out_{agg0} \in \mathbb{R}^{M \times 7 \times 7 \times hidsize1}$ with enhanced features after passing through the Agg layer. The computation formula is as follows:

$$out_{agg0} = \widehat{out}_{agg0} \odot score + \widehat{out}_{agg0}$$

This enhanced feature will serve as the input for the next encoder layer to further extract temporal features. Correspondingly, the WRAN network of the next layer changes from 14×14 in the previous layer to 7×7, thereby reducing the number of iterations required for parallel computation from 27 to 13, achieving an improvement in computational efficiency.

In some feasible examples, S3.8 specifically includes the following process.

The error prediction result is outputted by an MLP according to the final features.

Specifically, the MLP is one of the most commonly used neural networks. The temporal features obtained after previous computations are concatenated with $out_{agg0}$, and then inputted into the MLP after resizing and dimension transformation. The final output undergoes another dimension transformation to obtain the result $\hat{E}_{DL} \in \mathbb{R}^{M \times 672 \times 3}$, which is the three-axis prediction error of the Kepler's dynamical model within 14 days.

Finally, the extrapolated result outputted by the dynamical equation is subtracted from the error prediction result of this prediction model to obtain the corrected orbital prediction value.

In some feasible examples, S3.2 specifically includes the following process.

The prediction model is trained based on the gradient descent algorithm.

The input-output format of this model is clarified. Based on the broadcast ephemeris data, the three-axis position of satellite serves as the input, and the extrapolation error value serves as the label. Satellite position in ephemeris data is the most critical positioning information.

According to the established prediction model, the hyperparameters of the network layers that need to be determined include: 1) the number of neurons in the hidden layer; 2) the number of layers of WRAN, the number of encoders, and the number of heads in their MHA modules; 3) the number of layers of MLP network in the prediction part after fusion; and 4) the selection of convolutional kernels and step sizes for Agg.

In terms of selection of optimizer, this example chooses the Adam optimizer with adaptive learning rates. It dynamically adjusts the learning rate of each parameter using the first-order moment estimate and second-order moment estimate of gradients. Its advantage is that after bias correction, the learning rate has a determined range in each iteration, resulting in smoother parameters.

The task of the present disclosure is a prediction task. The mean absolute error (MAE) loss function is used as the evaluation index for updating weights, and its computation formula is as follows:

$$\mathcal{L}_{loss} = -\frac{1}{M} \sum_{k=1}^{M} |E(k) - \hat{E}_{DL}(k)|$$

where E represents a prediction error for an orbit at an actual moment, $\hat{E}_{DL}$ represents a corrected value outputted by the prediction model, and E(k), and $\hat{E}_{DL}(k)$ represent a $k_{th}$ sample in E and $\hat{E}_{DL}$, respectively. The closer the output $\hat{E}_{DL}$ and E of the trained model, the more accurate the final hybrid prediction result.

The total number of trainings is set. During training, the backpropagation algorithm is used to compute gradients for updating the weights and biases of the model.

Based on the above steps, the trained ephemeris prediction model is deployed onto the chip inside the receiver. During periods when the receiver cannot receive or chooses not to receive broadcast ephemeris, it can use the internal Kepler's dynamical model to perform initial predictions based on the last received broadcast ephemeris data. Then, the final stored extrapolation error and the corresponding extrapolated state are inputted into the deep learning model to obtain a compensation value. The initial prediction is added to the compensation value to achieve the final prediction, obtaining a more accurate satellite orbit over an extended period of time, which can be used in conjunction with the chip of receiver.

In the present disclosure, the characteristic of describing the satellite state at the same moment across different epochs is considered, and WRAN feature extraction is utilized to enable the model to simultaneously extract temporal features for HVGSU nodes of prediction errors and states of satellites at the same moment across different epochs. Additionally, the model proposed in the present disclosure inherently possesses recursive temporal characteristics, making it better at discovering the evolution rule of errors compared to a Transformer model using positional encoding, and providing more accurate prediction results. Finally, the WRAN used in the model of the present disclosure can extract temporal features from both within and between epochs, using fewer parameters compared to other methods.

This method leverages AI technology to thoroughly model complex perturbative forces and nonlinear time-varying rules not fully considered by traditional dynamic models, achieving a long-term BeiDou satellite ephemeris with strong generalization and high prediction accuracy, thereby maintaining stable operation and rapid positioning of the receiver on the user side.

Figure 2:
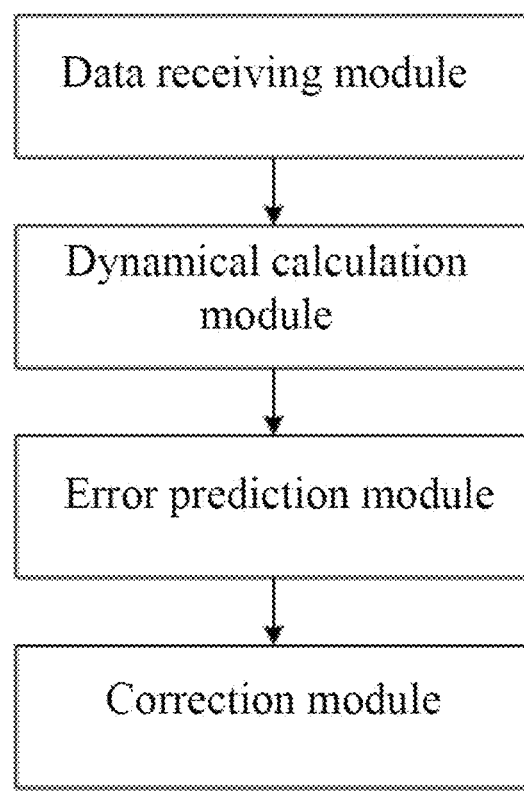
FIG. 2 is a structural diagram of a BeiDou satellite ephemeris prediction system based on a water-wave parallel network according to the present disclosure.

As shown in FIG. 2, a BeiDou satellite ephemeris prediction system based on a water-wave parallel network includes:
  a data receiving module for obtaining broadcast ephemeris data;
  a dynamical calculation module for calculating according to the broadcast ephemeris data to obtain a sequence of extrapolation errors and historical extrapolated states;
  an error prediction module for inputting the sequence of extrapolation errors and the historical extrapolated states into a pre-trained prediction model to output an error prediction result, the prediction model including a patch layer, a WRAN, an Attn layer, and an Agg layer; and
  a correction module for obtaining a corrected orbit prediction according to the error prediction result and the current extrapolated results.

The content in the aforementioned method examples is applicable to this system example. The specific functions implemented and the beneficial effects achieved in this system example are the same as those in the aforementioned method examples.

A BeiDou satellite ephemeris prediction device based on a water-wave parallel network includes:
  at least one processor; and
  at least one memory, for storing at least one program; and
  when the at least one program is executed by the at least one processor, the at least one processor implements the BeiDou satellite ephemeris prediction method based on a water-wave parallel network as described above.

The content in the aforementioned method examples is applicable to this device example. The specific functions implemented and the beneficial effects achieved in this device example are the same as those in the aforementioned method examples.

A storage medium stores instructions executable by a processor. The instruction executable by a processor, when executed by the processor, implements the BeiDou satellite ephemeris prediction method based on a water-wave parallel network as described above.

The content in the aforementioned method examples is applicable to this storage medium example. The specific functions implemented and the beneficial effects achieved in this storage medium example are the same as those in the aforementioned method examples.

The preferred examples of the present disclosure are described in detail above, but they are not intended to limit the present disclosure. Those skilled in the art may make various equivalent modifications or substitutions without departing from the spirit of the present disclosure, and these equivalent modifications or substitutions are all included in the scope defined by the claims of the present application.

The invention claimed is:

1. A BeiDou satellite ephemeris prediction method based on a water-wave parallel network, comprising the following steps:
  obtaining broadcast ephemeris data and historical precise satellite orbit data,
  calculating according to the broadcast ephemeris data to obtain current extrapolated satellite orbit data and historical extrapolated satellite orbit data,
  subtracting the historical precise satellite orbit data from the historical extrapolated satellite orbit data to obtain a sequence of extrapolation errors,
  inputting the sequence of extrapolation errors and the historical extrapolated satellite orbit data into a pre-trained prediction model to output an error prediction result,
  the pre-trained prediction model comprising a patch layer, a first attention (Attn) layer, and an aggregation (Agg) layer, and
  obtaining a corrected orbit prediction according to the error prediction result and the current extrapolated satellite orbit data,
  the pre-trained prediction model being provided with an encoder channel and a decoder channel, wherein
  the inputting the sequence of extrapolation errors and the historical extrapolated satellite orbit data into a pre-trained prediction model to output an error prediction result specifically comprises:
  concatenating the sequence of extrapolation errors and the historical extrapolated satellite orbit data to obtain concatenated data;
  compressing, based on the patch layer, the concatenated data and the sequence of extrapolation errors separately to obtain compressed concatenated data and a compressed sequence of extrapolation errors;
  inputting the compressed concatenated data into the encoder channel to generate an encoder output;
  inputting the compressed sequence of extrapolation errors into the decoder channel to generate a decoder output;
  performing feature fusion, based on the first Attn layer, on the encoder output and the decoder output to obtain final features; and
  outputting the error prediction result according to the final features;
  the encoder channel sequentially comprises a first water-wave recurrent acceleration network (WRAN), an Agg layer, and a second WRAN, and the inputting the compressed concatenated data into the encoder channel to generate an encoder output specifically comprises:
  inputting the compressed concatenated data into the encoder channel;
  performing feature extraction by the first WRAN on the compressed concatenated data to obtain first layer temporal features and first epoch temporal features;

performing feature enhancement on the first layer temporal features by the Agg layer to obtain aggregated temporal features; and performing re-extraction on the aggregated temporal features by the second WRAN to obtain the encoder output; and the decoder channel comprises a third WRAN and a second Attn layer, and the inputting the compressed sequence of extrapolation errors into the decoder channel to generate a decoder output specifically comprises:

inputting the first epoch temporal features and the compressed sequence of extrapolation errors into the decoder channel;

performing feature extraction by the third WRAN on the compressed sequence of extrapolation errors to obtain third epoch temporal features; and fusing the first epoch temporal features with the third epoch temporal features by the second Attn layer to obtain the decoder output.

2. The BeiDou satellite ephemeris prediction method based on a water-wave parallel network according to claim 1, wherein the broadcast ephemeris data is expressed as follows:

$$A = [a_0 \ldots a_{t-1} \, a_t]$$

where A represents all the broadcast ephemeris data; $a_0$ represents broadcast ephemeris data at an initial moment; $a_{t-1}$ represents broadcast ephemeris data at a moment t−1; and $a_t$ represents broadcast ephemeris data at a moment t.

3. The BeiDou satellite ephemeris prediction method based on a water-wave parallel network according to claim 1, wherein the calculating according to the broadcast ephemeris data to obtain current extrapolated satellite orbit data and historical extrapolated satellite orbit data specifically comprises:

the broadcast ephemeris data comprising current broadcast ephemeris data and historical broadcast ephemeris data;

calculating using a dynamical model according to the current broadcast ephemeris data, to generate the current extrapolated satellite orbit data; and calculating using the dynamical model according to the historical broadcast ephemeris data, to generate the historical extrapolated satellite orbit data.

4. The BeiDou satellite ephemeris prediction method based on a water-wave parallel network according to claim 1, wherein each WRAN has a net structure, and nodes in each WRAN are horizontal vertical gated selective units (HVGSU).

5. A BeiDou satellite ephemeris prediction system based on a water-wave parallel network, comprising:

at least one processor; and at least one memory, for storing at least one program; and when the at least one program is executed by the at least one processor, the at least one processor implements a BeiDou satellite ephemeris prediction method based on a water-wave parallel network, comprising the following steps:

obtaining broadcast ephemeris data and historical precise satellite orbit data, calculating according to the broadcast ephemeris data to obtain current extrapolated satellite orbit data and historical extrapolated satellite orbit data; and subtracting the historical precise satellite orbit data from the historical extrapolated satellite orbit data to obtain a sequence of extrapolation errors, inputting the sequence of extrapolation errors and the historical extrapolated satellite orbit data into a pre-trained prediction model to output an error prediction result, the pre-trained prediction model comprising a patch layer, a first Attn layer, and an Agg layer, and obtaining a corrected orbit prediction according to the error prediction result and the current extrapolated satellite orbit data;

the pre-trained prediction model being provided with an encoder channel and a decoder channel, wherein the inputting the sequence of extrapolation errors and the historical extrapolated satellite orbit data into a pre-trained prediction model to output an error prediction result specifically comprises: concatenating the sequence of extrapolation errors and the historical extrapolated satellite orbit data to obtain concatenated data; compressing, based on the patch layer, the concatenated data and the sequence of extrapolation errors separately to obtain compressed concatenated data and a compressed sequence of extrapolation errors; inputting the compressed concatenated data into the encoder channel to generate an encoder output; inputting the compressed sequence of extrapolation errors into the decoder channel to generate a decoder output; performing feature fusion, based on the first Attn layer, on the encoder output and the decoder output to obtain final features; and outputting the error prediction result according to the final features;

the encoder channel sequentially comprises a first WRAN, an Agg layer, and a second WRAN, and the inputting the compressed concatenated data into the encoder channel to generate an encoder output specifically comprises: inputting the compressed concatenated data into the encoder channel; performing feature extraction by the first WRAN on the compressed concatenated data to obtain first layer temporal features and first epoch temporal features; performing feature enhancement on the first layer temporal features by the Agg layer to obtain aggregated temporal features; and performing re-extraction on the aggregated temporal features by the second WRAN to obtain the encoder output; and the decoder channel comprises a third WRAN and a second Attn layer, and the inputting the compressed sequence of extrapolation errors into the decoder channel to generate a decoder output specifically comprises: inputting the compressed sequence of extrapolation errors into the decoder channel; performing feature extraction by the third WRAN on the compressed sequence of extrapolation errors to obtain third epoch temporal features; and fusing the first epoch temporal features with the third epoch temporal features by the second Attn layer to obtain the decoder output.

* * * * *